(12) United States Patent
Elango et al.

(10) Patent No.: US 12,307,372 B2
(45) Date of Patent: May 20, 2025

(54) DATA-AWARE MODEL PRUNING FOR NEURAL NETWORKS

(71) Applicant: Microsoft Technology Licensing, LLC, Redmond, WA (US)

(72) Inventors: Venmugil Elango, Redmond, WA (US); Bita Darvish Rouhani, Bellevue, WA (US); Eric S Chung, Woodinville, WA (US); Douglas C Burger, Bellevue, WA (US); Maximilian Golub, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 966 days.

(21) Appl. No.: 17/334,613

(22) Filed: May 28, 2021

(65) Prior Publication Data

US 2022/0383123 A1    Dec. 1, 2022

(51) Int. Cl.
*G06N 3/00* (2023.01)
*G06N 3/04* (2023.01)
*G06N 3/082* (2023.01)

(52) U.S. Cl.
CPC ............... *G06N 3/082* (2013.01); *G06N 3/04* (2013.01)

(58) Field of Classification Search
CPC .................................. G06N 3/082; G06N 3/04
See application file for complete search history.

(56) References Cited

U.S. PATENT DOCUMENTS

| | | | |
|---|---|---|---|
| 10,936,913 B2* | 3/2021 | Yao | G06F 18/217 |
| 2019/0087729 A1* | 3/2019 | Byun | G06N 3/045 |
| 2019/0197406 A1 | 6/2019 | Darvish Rouhani et al. | |
| 2019/0286945 A1* | 9/2019 | Kamath | G06F 18/2413 |
| 2019/0311258 A1* | 10/2019 | Zhang | G06N 3/08 |
| 2021/0125065 A1* | 4/2021 | Turcot | G06N 3/084 |
| 2021/0256383 A1* | 8/2021 | Wang | G06N 3/04 |
| 2021/0397965 A1* | 12/2021 | Zhang | H03M 7/3059 |
| 2022/0036189 A1* | 2/2022 | Courville | G06N 3/082 |

(Continued)

FOREIGN PATENT DOCUMENTS

CN    112836817 A    *    5/2021

OTHER PUBLICATIONS

Sparse Weight Activation, Raihan et al., University of British Columbia, Vancouver, 24 pages (Year: 2020).*

(Continued)

*Primary Examiner* — Barbara M Level
(74) *Attorney, Agent, or Firm* — Holzer Patel Drennan (57) ABSTRACT

Embodiments of the present disclosure include systems and methods for performing data-aware model pruning for neural networks. During a training phase, a neural network is trained with a first set of data. During a validation phase, inference with the neural network is performed using a second set of data that causes the neural network to generate a first set of outputs at a layer in the neural network. During the validation phase, a plurality of mean values and a plurality of variance values are calculated based on the first set of outputs. A plurality of entropy values are calculated based on the plurality of mean values and the plurality of variance values. A second set of outputs are pruned based on the plurality of entropy values. The second set of outputs are generated by the layer of the neural network using a third set of data.

17 Claims, 9 Drawing Sheets

(56) References Cited

U.S. PATENT DOCUMENTS

2022/0138578 A1* 5/2022 Nakadai ............... G06N 3/082
  706/15
2022/0366236 A1* 11/2022 Mesmakhosroshahi ...................
  G06N 3/084

OTHER PUBLICATIONS

Hur, et al., "An Entropy-based Pruning Method for CNN Compression", In the Journal of Super computing, vol. 75, Issue 6, Nov. 10, 2018, pp. 2950-2963.

"International Search Report and Written Opinion Issued in PCT Application No. PCT/US22/027546", Mailed Date: Jul. 29, 2022, 15 Pages.

* cited by examiner

DATA-AWARE MODEL PRUNING FOR NEURAL NETWORKS

BACKGROUND

The present disclosure relates to computing hardware. More particularly, the present disclosure relates to techniques for training and using neural networks.

A neural network is a machine learning model used for a variety of different applications (e.g., image classification, computer vision, natural language processing, speech recognition, writing recognition, etc.). A neural network may be trained for a particular purpose by running datasets through it, comparing results from the neural network to known results, and updating the network based on the differences.

Deep neural networks (DNNs) have grown exponentially in size over the past years in order to achieve better accuracies. Despite their high accuracies, DNNs typically need significant computational cost both in training and inference. Different types of techniques can be used to reduce computations costs associated with DNNs and/or reduce the size of DNNs. One type of technique is adding sparsity techniques. These techniques introduce sparsity to input data, weights, and/or activations.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for performing data-aware model pruning for neural networks. In some embodiments, a computing system uses data from a training data set to train a neural network during a training phase. After a defined number of iterations of training the neural network, the computing system uses the neural network for inference during a validation phase in which data from the training data set that is reserved for validation purposes (i.e., it is not used for training the neural network) are processed through the neural network. During this validation phase, the computing system maintains a running mean value and a variance value for each element position in the activation matrices generated in a particular layer of the neural network. After the validation phase is complete, the computing system calculates an entropy value for each element position in the activation matrices generated by the particular layer based on the corresponding mean and variance values. During another training phase in which the neural network is trained with data from the training data set, the computing system prunes activation matrices generated by the particular layer based on the entropy values. The computing system can simultaneously apply the aforementioned technique to any number of other layers in the neural network.

Figure 1:
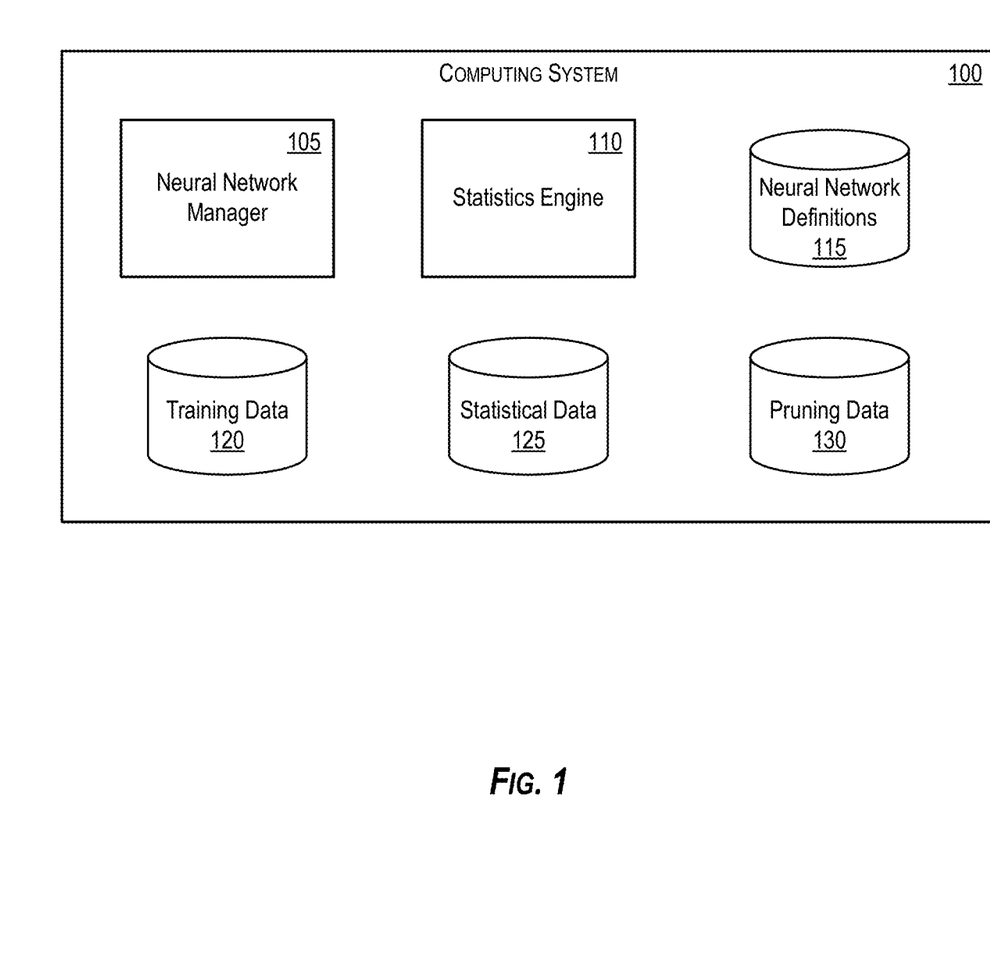
FIG. 1 illustrates a computing system for training and using neural networks according to some embodiments.

FIG. 1 illustrates a computing system for training and using neural networks according to some embodiments. As shown, computing system 100 includes neural network manager 105, statistics engine 110, and storages 115-130. Neural network definitions storage 115 is configured to store definitions of neural networks. In some embodiments, a definition of a neural network specifies the number of layers in the neural network, the number of nodes in each layer, the weights in the neural network, the activations functions used in the nodes, the loss function used to compute losses, etc.

Training data storage 120 stores training data sets for training neural networks. In some embodiments, a training data set includes a set of samples (also referred to as training samples). Each sample includes a set of inputs (also referred to as input data) and a set of expected outputs (also referred to as expected output data). For instance, a set of inputs of a sample can be a matrix or vector of a set of numerical values (e.g., integers, floating point numbers, etc.). Similarly, a set of expected outputs of a sample can be a matrix or vector of a set of numerical values (e.g., integers, floating point numbers, etc.). In addition, training data storage 120 may store training parameters used for training neural networks. Examples of training parameters may include a number of samples in a training data set, a batch size (e.g., a number of samples to process in an training iteration), a number of iterations to run during a training phase, a number of sample data to process during a validation phase, a proportion of an activation matrix to prune, an entropy value threshold, a mean threshold, a variance threshold, etc.

Statistical data storage 125 is configured to store statistical data associated with neural networks. Examples of such statistical data includes mean values of activations, variance values of activations, entropy values of activations, etc. Pruning data storage 130 is configured to store pruning data associated with neural networks. For instance, pruning masks can be stored in pruning data storage 130. In some embodiments, storages 115-130 are implemented in a single physical storage while, in other embodiments, storages 115-130 may be implemented across several physical storages. While FIG. 1 shows storages 115-130 as part of computing system 100, one of ordinary skill in the art will appreciate that neural network definitions storage 115, training data storage 125, statistical data storage 125, and/or pruning data storage 130 may be external to computing system 100 in some embodiments.

Figure 2:
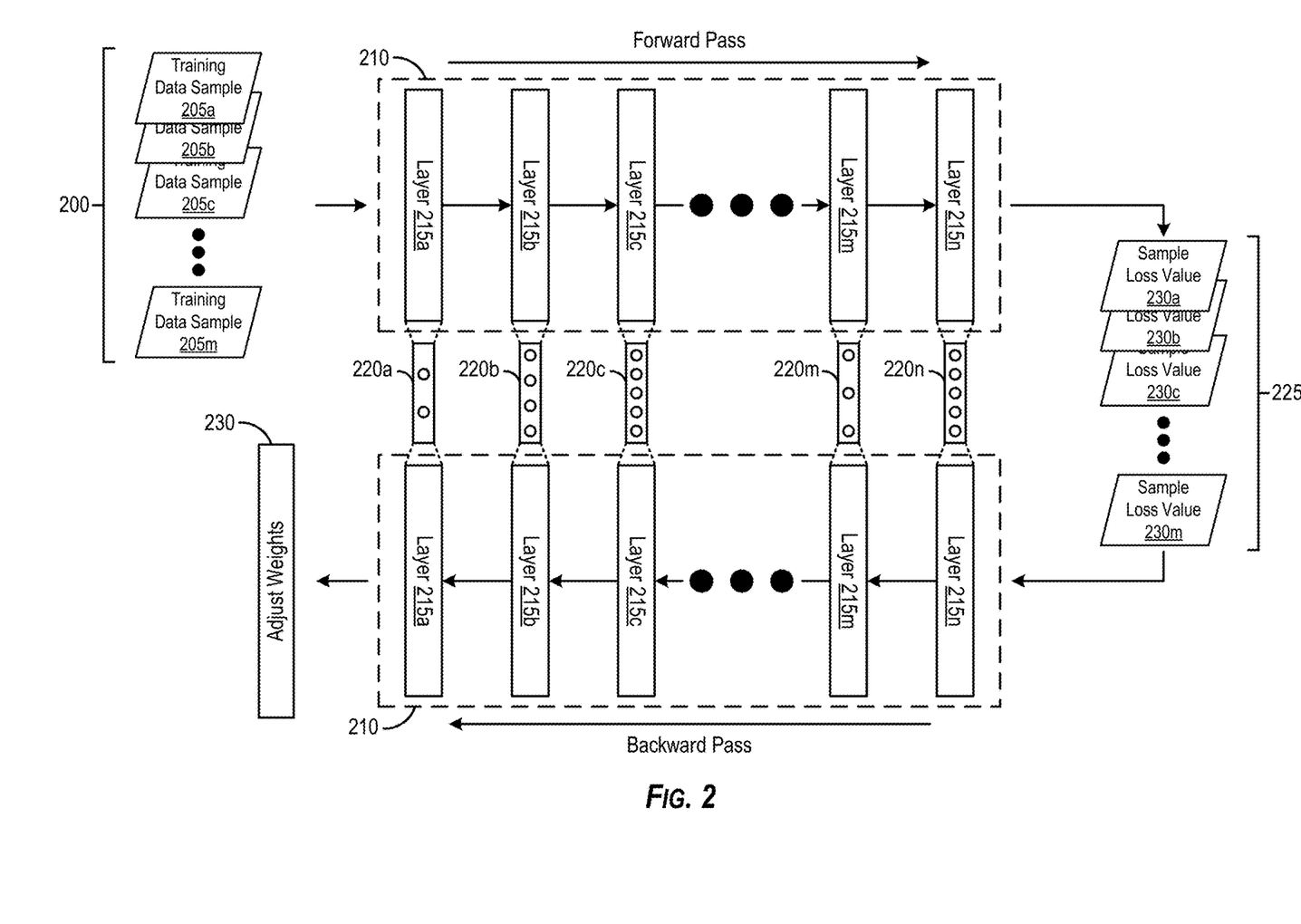
FIG. 2 illustrates an example training iteration for training a neural network according to some embodiments.

Neural network manager 105 and statistics engine 110 will now be described by reference to several example operations illustrated in FIGS. 2-6. For the first example operation, neural network manager 105 receives a request from computing system 100 (or another device such as a client device communicatively coupled to computing system 100) to train neural network 210 with a training data set. In response to the request, neural network manager 105 accesses neural network definitions storage 125 and retrieves the neural network definition associated with neural network 210 as well as the training parameters associated with neural network 210. Neural network manager 105 then generates neural network 210 based on the neural network definition. As shown in FIG. 2, neural network 210 includes layers 215a-n. Each of the layers 215a-n include a set of corresponding weights 220. Here, neural network manager 105 initializes the values of weights 220a-n with randomly generated values (e.g., integers, floating point numbers, etc.).

Next, neural network manager 105 accesses training data storage 135 to retrieve the specified training data set for training neural network 210. Neural network manager 105 starts a training phase for neural network 210 in which a defined number of training iterations, which is specified in the training parameters, are performed on neural network 210. FIG. 2 illustrates an example training iteration for training neural network 210 according to some embodiments. Specifically, FIG. 2 shows an example of a training iteration that is performed on neural network 210 during the training phase for this example operation. For the training iteration, neural network 210 is trained using batch of samples 200, which includes training data samples 205a-m. The number of samples in batch of samples 200 is determined based on the batch size specified in the training parameters associated with neural network 210. To generate batch of samples 2100, neural network manager 105 randomly selects samples 205a-m from the training data set. Then, neural network manager 105 processes each sample 205 in batch of samples 200 through a forward pass (also referred to as a feed forward pass) of neural network 210. Neural network 210 generates an output for each sample 205 that is processed through it.

Based on the outputs that neural network 210 generates for batch of samples 200 and the expected outputs of training data samples 205a-m in batch of samples 200, neural network manager 105 calculates corresponding loss values 230a-m. Neural network 210 can be configured to use any number of different loss functions (e.g., a mean squared error loss function, a mean squared logarithmic error loss function, a mean absolute error loss function, a cross-entropy loss function, etc.) to compute loss values 230a-m. Based on batch of loss values 225, neural network manager 105 calculates an average of loss values 230a-m.

Then, neural network manager 105 uses the average of loss values 230a-m to generate a set of gradients during a backward pass of neural network 210. In some embodiments, neural network manager 105 generates the set of gradients using a backpropagation technique. Next, neural network manager 105 uses the set of gradients to adjust, at operation 230, weights 220a-n of neural network 210. In some embodiments, neural network manager 105 uses a gradient method (e.g., a gradient descent method, a stochastic gradient descent method, etc.) to adjust weights 220a-n in neural network 210.

FIG. 2 illustrates an example of an iteration of training neural network 210. In some embodiments, neural network manager 105 trains neural network 210 through a defined number of iterations, which is specified in the training parameters associated with neural network 210, using batches of samples randomly selected from the training data set that are the same size as batch of samples 200. In this initial training phase, weights 220a-n of neural network are adjusted in the backward pass of each iteration.

After the initial training phase, neural network manager 105 starts a validation phase in which validation data is processed through neural network 210 in forward passes (e.g., the validation data is not processed through backward passes and weights 220a-n are not adjusted). In some embodiments, validation data is data in the training data set reserved for processing in validation phases and not used for training a neural network. In other words, data used for validating a neural network and data used for training the neural network are mutually exclusive. The processing of validation data through neural network 210 may be referred to as using neural network 210 for inference.

Figure 3:
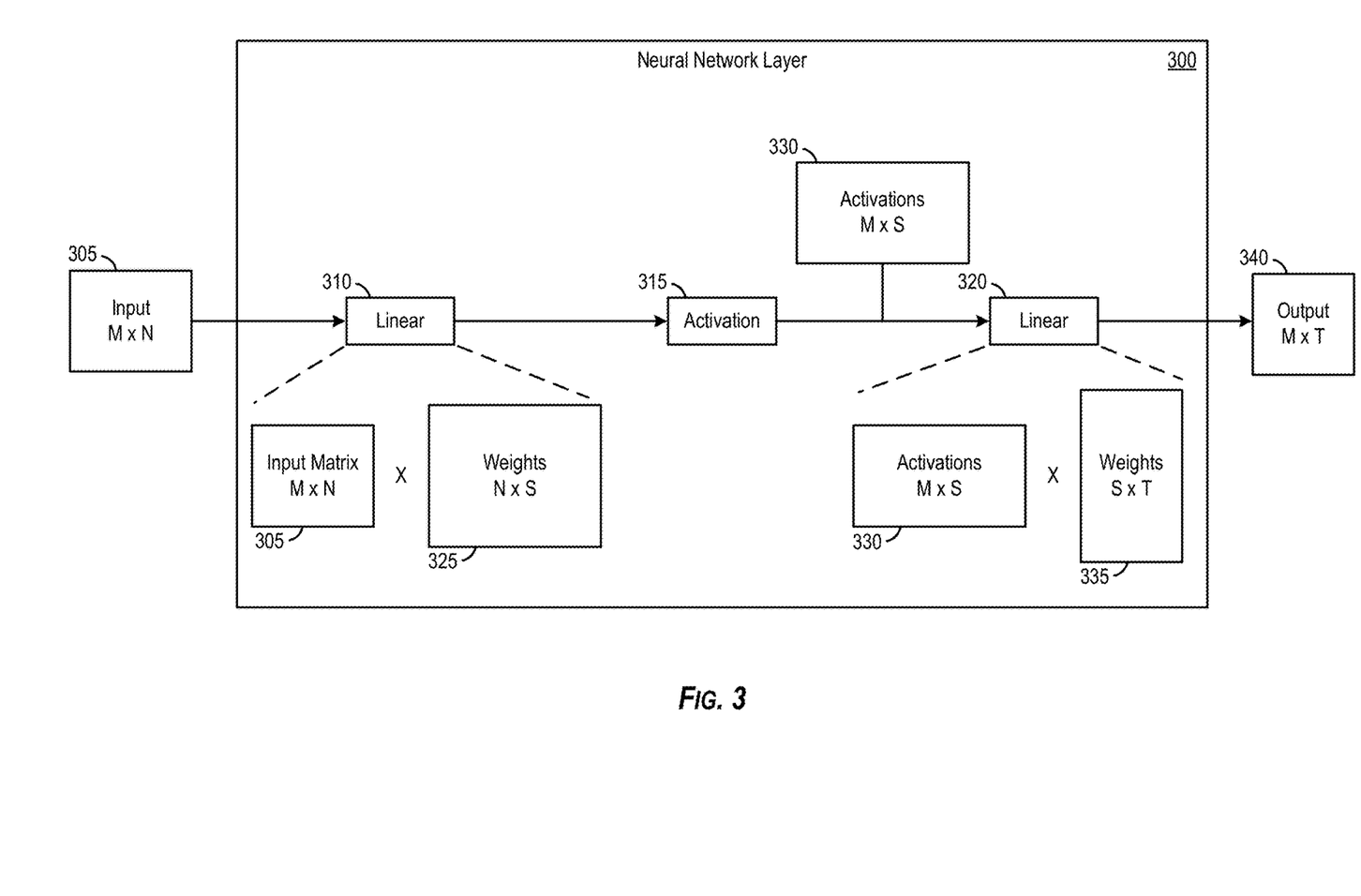
FIG. 3 illustrates an example feed forward pass through a neural network layer according to some embodiments.

FIG. 3 illustrates a feed forward pass through a neural network layer 300 according to some embodiments. In particular, FIG. 3 illustrates an example of processing one training sample during a feed forward pass during a validation phase in which validation data is processed through a neural network to which neural network layer 300 belongs. Neural network layer 300 may be used to implement any of the layers 215a-n in neural network 210.

As shown, neural network layer 300 includes linear layer 310, activation layer 315, and linear layer 320. Linear layer 310 is configured to perform a linear transformation on an input matrix to generate an output matrix. In this example, linear layer 310 is configured to multiply a given input matrix by weights matrix 325 to generate the output matrix, which is sent to activation layer 315. Activation layer 315 performs activation functions on an input matrix to generate an output matrix. Activation layer 315 forwards the output matrix to linear layer 320. Linear layer 310 is responsible for perform a linear transformation on an input matrix to generate an output matrix.

In this example feed forward pass through neural network layer 300, linear layer 310 receives an input 305, which is an M×N matrix. Input 305 can be the output generated by a previous layer in the neural network. For example, if neural network layer 300 is layer 215c of neural network 210, input 305 may be the output generated by layer 215b. When linear layer 310 receives input 305, linear layer 310 multiplies input 305 with weights matrix 325. As input 305 is an M×N matrix and weights matrix 325 is an N×S, the output generated by linear layer 310 is an M×S matrix. Linear layer 310 sends this M×S output matrix to activation layer 315.

When activation layer 315 receives the output matrix from linear layer 310, activation layer 315 performs activation functions to the elements in the M×S output matrix to generate activations matrix 330, which is also an M×S matrix. Next, activation layer 315 sends activations matrix 330 to linear layer 320. Upon receiving the activations matrix 330, linear layer 320 multiplies it with weights matrix 335 to generate output 340. Since activations matric 330 is an M×S matrix and weights matrix 335 is an S×T matrix, output 340 is an M×T matrix. Output 340 can be forwarded as input to the next layer in the neural network.

FIG. 3 shows one forward pass through neural network layer 300 (i.e., the processing of one sample from the validation data through neural network layer 300). During the validation phase of validation neural network 210, statistics engine 110 collects and generates statistical data from each layer 215 in neural network 210. For example, if each layer 215 is implemented using neural network layer 300, statistics engine 110 collects values of the activations in each activation matrix (e.g., activations matrix 330) generated by activation layer 315. For each position in the activation matrices, statistics engine 110 calculates a running mean value and variance value based on the corresponding activation values in the position. For instance, statistics engine 110 can calculate a running mean value for the position in the first row and first column of the activation matrices based on activation values in the first row and first column of the activation matrices that have been generated by activation layer 315. So if the value in the first row and first column of a first activation matrix generated by activations layer 315 is 12 and the value in the first row and first column of a second activation matrix generated by activations layer 315 is 6, statistics engine 110 calculates a running mean value of 9 (i.e., (12+6)/2) for this position. If the value in the first row and first column of a third activation matrix generated by activations layer 315 is 8, statistics engine 110 calculates the running mean value for this position as 8.66 (i.e., (12+6+8)/3). Statistics engine 110 calculates a running mean value for each position in the activation matrices (M×S running mean values in this example) based on the corresponding activation values in activation matrices generated by activation layer 315. Additionally, statistics engine 110 calculates a running variance value for each position in the activation matrices based on the respective activation values in the activation matrices generated by activation layer 315.

After the validation phase is complete, statistics engine 110 generates entropy values for each position in the activation matrices based on the corresponding mean value and variance value. For instance, statistics engine 110 calculates an entropy value for the position in the first row and first column of the activation matrices based on the running mean and variance values calculated for that position. In some embodiments, statistics engine 110 uses the following equation to calculate an entropy value:

$$h(x) = \frac{\ln(\sigma\sqrt{2\pi e})}{\ln(2)}$$

wherein σ is the calculated running variance value.

Based on the entropy values, neural network manager 105 prunes values in output matrices generated by activation layer 315 during subsequent training phases or performing feed forward passes through neural network layer 300 (e.g., using the neural network to which neural network 300 belongs for inference). In some embodiments, neural network manager 105 uses a pruning mask to prune values in output matrices. A pruning mask may be a matrix with the same dimension as the activation matrices generated by activation layer 315 (M×S in this example). Then, neural network manager 105 stores a first defined value (e.g., a value of 0) or a second defined value (e.g., a value of 1) in each element in the pruning matrix. The first defined value is used for pruning values in an activation matrix and the second defined value is used for keeping values in an activation matrix.

Neural network manager 105 can use different techniques for determining which defined value to store in a particular element in a pruning mask. For example, in some embodiments, neural network manager 105 uses a defined threshold entropy value, which is specified in the training parameters, to determine whether to store the first defined value or the second defined value in each element in a pruning mask. If the entropy value calculated for a particular position in the activation matrices is less than the defined threshold entropy value, neural network manager 105 stores the first defined value in the corresponding position in the pruning mask. Otherwise, neural network manager 105 stores the second defined value. Neural network manager 105 iterates through each element in the pruning mask and stores one of the defined values in a similar manner. In other embodiments, instead of using a defined entropy threshold value to determine which defined value to store in the elements of the pruning mask, neural network manager 105 uses a defined proportion of elements in which to store the first defined value. The defined proportion can be specified in the training parameters. For instance, if the defined proportion is 15%, neural network manager 105 identifies 15% of the lowest entropy values and stores the first defined value in the corresponding elements of the pruning mask. Neural network manager 105 stores the second defined value in the remaining elements in the pruning mask.

Figure 4:
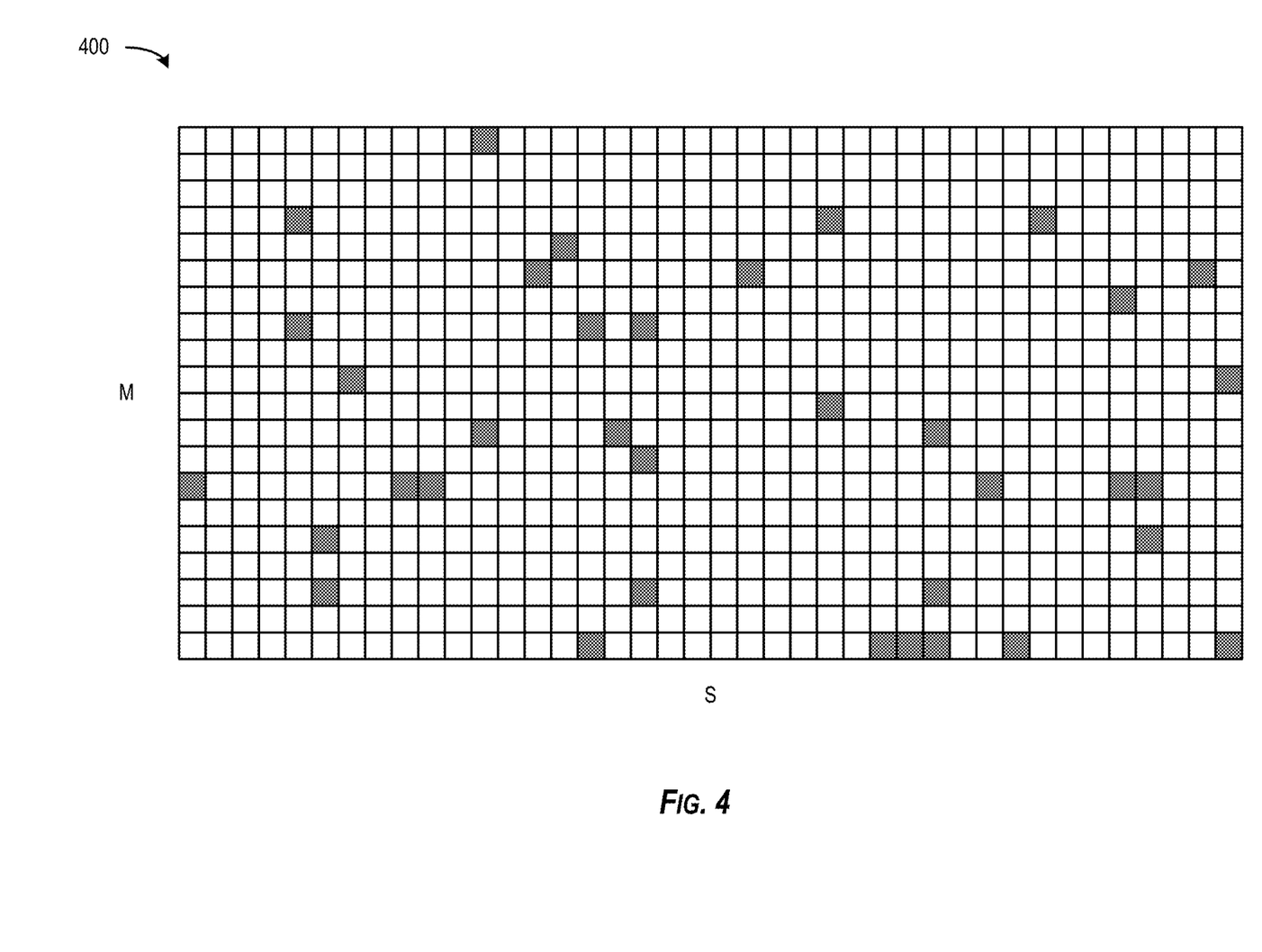
FIG. 4 illustrates an example pruning mask according to some embodiments.

FIG. 4 illustrates an example pruning mask 400 according to some embodiments. Specifically, pruning mask 400 is an example of a pruning mask that neural network manager 105 generates for neural network layer 300. As shown, pruning mask 400 is a matrix with dimensions M×S. Elements in pruning mask 300 with the first defined value stored in them are indicated as gray. Elements in pruning mask 300 that have the second defined value stored in them are indicated as white. In embodiments that use a defined entropy threshold value, neural network manager 105 determined that the entropy values associated with white elements in pruning mask 400 were greater than or equal to the defined threshold entropy value and, hence, stored the second defined value in these elements. In addition, neural network manager 105 determined that the entropy values associated with the gray elements in pruning mask 400 were less than the defined entropy threshold value and, as such, stored the first defined value in these elements. In embodiments where a defined proportion is used, neural network manager 105 determined that the entropy values associated with the gray elements in pruning mask 400 were in the defined proportion that have the lowest entropy values. Neural network manager 105 stored the first defined value in the gray elements. For the white elements, neural network manager 105 stored the second defined value in each of them.

In some embodiments, neural network manager 105 determines which defined value to store in elements of a pruning make on a column-by-column basis. For example, in some such embodiments, neural network manager 105 calculates an average entropy value for each column based on the entropy values in the column. Then, neural network manager 105 determines which defined value to store in a column of the pruning mask based on the average entropy value associated with the column. In cases where a defined entropy threshold value is used, neural network manager 105 stores the first defined value in each element in a particular column if the average entropy value associated with the column is less than the defined entropy threshold value. If the average entropy value associated with the column is greater than or equal to the defined entropy threshold value, neural network manager 105 stores the second defined value in each element in the particular column. In cases where a defined proportion is used, neural network manager 105 determines the defined proportion of average entropy values with the lowest values. Then, neural network manager 105 stores the first defined value in each element in each of these columns and stores the second defined value in each element in the remaining columns.

Figure 5:
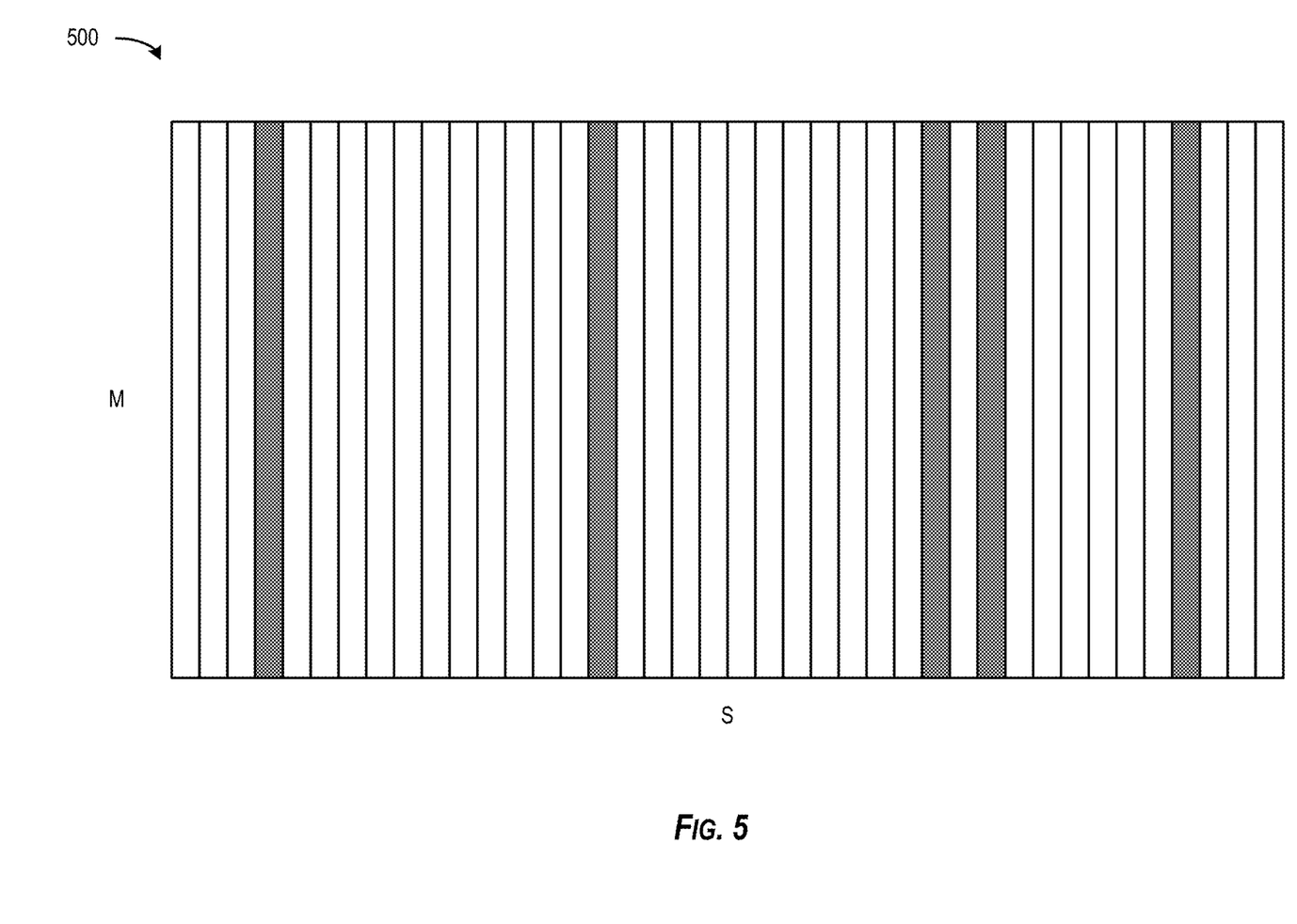
FIG. 5 illustrates another example pruning mask according to some embodiments.

FIG. 5 illustrates another example pruning mask 500 according to some embodiments. Specifically, pruning mask 400 is an example of a pruning mask that neural network manager 105 generates for neural network layer 300 using the column-by-column approach explained above. As depicted in FIG. 5, pruning mask 500 is a matrix with dimensions M×S. Similar to FIG. 4, elements in pruning mask with the first defined value stored in them are indicated as gray and elements in pruning mask 300 that have the second defined value stored in them are indicated as white. For the cases where a defined entropy threshold value is used, neural network manager 105 determined that the average entropy values associated white columns in pruning mask 400 were greater than or equal to the defined threshold entropy value. Also, neural network manager 105 determined that the average entropy values associated with the gray columns in pruning mask 400 were less than the defined entropy threshold value. For cases that use a defined proportion, neural network manager 105 determined that the average entropy values associated with the gray columns in pruning mask 400 were in the defined proportion that have the lowest entropy values and, thus, stored the first defined value in each element in these columns. Neural network manager 105 stored the second defined value in each element of the remaining columns (i.e., the white columns). While the above example shows how neural network manager 105 can store different defined values in a pruning mask on a column-by-column basis, one of ordinary skill in the art will understand that this technique can also be applied on a row-by-row basis.

Figure 6:
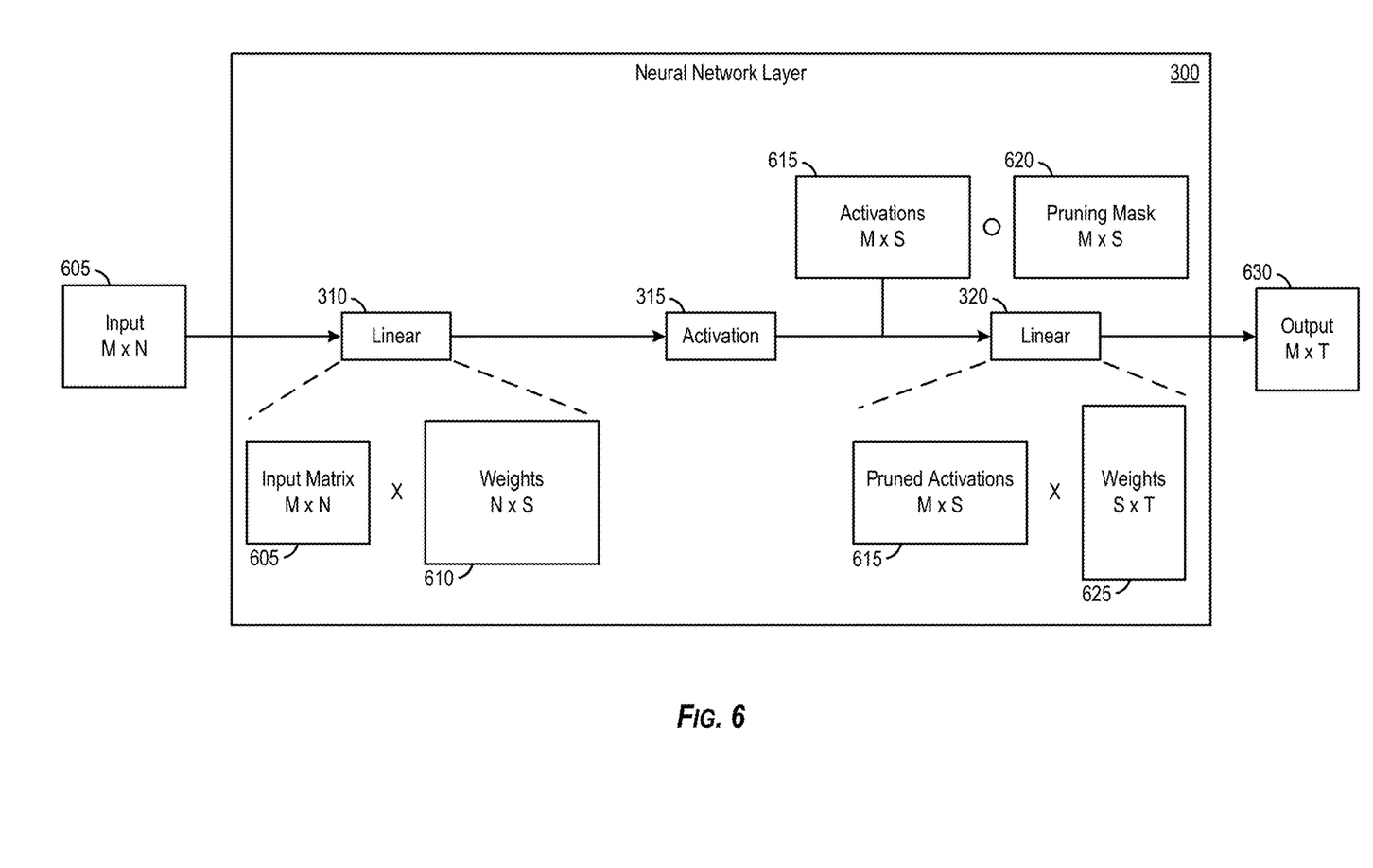
FIG. 6 illustrates a feed forward pass through the neural network layer illustrated in FIG. 3 using a pruning mask according to some embodiments.

Once neural network manager 105 generates a pruning mask for a network layer based on the statistical data collected from the layer during a validation phase, neural network manager 105 may use the pruning mask in another training phase in which data from the training data set is used to train neural network 210. FIG. 6 illustrates a feed forward pass through neural network layer 300 using a pruning mask (e.g., pruning mask 400 or pruning mask 500) according to some embodiments. In particular, FIG. 6 shows the processing of one sample training data in a feed forward pass during a training phase of the neural network (e.g., neural network 210) to which neural network layer 300 belongs. The backward pass and weight adjustment described above by reference to FIG. 2 still occurs after the feed forward pass, but is not shown here.

As shown in FIG. 6, linear layer 310 receives input 605. In this example, input 605 is an M×N matrix that may be the output generated by a previous layer in the neural network. In this example feed forward pass through neural network layer 300, linear layer 310 receives an input 305, which is an M×N matrix. Input 305 can be the output generated by a previously layer. Upon receiving input 605, linear layer 310 multiplies it with weights matrix 325 to generate an M×S output matrix. Linear layer 310 sends the M×S output matrix to activation layer 315. In response to receiving the output matrix, activation layer 315 performs activation functions to the elements in the M×S output matrix to generate activations matrix 615. Here, neural network layer 300 performs an element-by-element matrix multiplication operation (also referred to as a Hadamard product operation) between activations matrix 615 and pruning mask 620. As mentioned above, the elements in a pruning mask stores either a first defined value for pruning values or a second defined value for keeping values. Here, the first defined value is 0 and the second defined value is 1. Thus, when the element-by-element multiplication operation is performed between activations matrix 615 and pruning mask 620, elements in activations matrix 615 that are multiplied by 0 are effectively pruned from activations matrix 615. Elements in activations matrix 615 that are multiplied by 1 are still remain in activations matrix 615. The pruned activations matrix 615 is sent as input to linear layer 320. Linear layer 320 multiplies it with weights matrix 335 to generate output 630, which may be forwarded as input to the next layer in the neural network.

The examples and embodiments explained above by reference to FIGS. 1-6 show how training phase is performed followed by a validation phase in which a pruning mask is created. In some embodiments, neural network manager 105 repeatedly performs a training phase followed by a validation phase in the same manner described above until a defined criteria is met (e.g., the neural network reaches a defined level of accuracy, the neural network begins to diverge, the neural network begins to lose accuracy, etc.). For cases where a defined proportion is used to determine which defined value to store in elements of a pruning mask, neural network manager 105 iteratively increases the defined proportion after each validation phase. For instance, if the defined proportion specified in the training parameters is 5%, neural network manager 105 uses 5% for creating the pruning mask after the first validation phase, uses 10% for creating the pruning mask after the second validation phase, uses 15% for creating the pruning mask after the third validation phase, and so on and so forth.

Furthermore, the examples described above by reference to FIGS. 3-6 explain how pruning can be applied to one layer in a neural network. One of ordinary skill in the art will appreciate that these techniques can be applied to additional and/or different layers in a neural network. For example, in some embodiments, the pruning methods may be applied to each of the layers 215a-n in neural network 210. For some of these embodiments, neural network manager 105 can perform selective pruning on a layer-by-layer basis. For example, in some such embodiments, after a validation phase, neural network manager 105 computes a mean entropy value and a variance entropy value for of each layer in the neural network based on the entropy values calculated for the corresponding layer. Next, neural network layer 105 selects layers in the neural network with mean entropy values that are less than a defined mean entropy threshold value and variance entropy values that are less a defined variance entropy threshold value. Neural network manager 105 then adds a defined proportion of sparsity to the selected layers.

In addition, the examples described above by reference to FIGS. 3-6 show how pruning may be performed based on entropy metrics. In some embodiments, additional and/or different metrics can be collected during training and used to determine how to prune values in a neural network. For example, a diffusion metric can be used in combination with entropy metrics in some such embodiments. Diffusion may be defined as the absolute value of a differences (e.g., a delta) between the value of weights at a particular iteration and the value with which the weight are initialized. If such a diffusion metric collected during training is high and entropy metrics collected during training are also high, then no weights are pruned in both the forward passes and the backward passes during training. If the diffusion metric collected during training is high and entropy metrics collected during training are low, then weights can be pruned in both the forward passes and the backward passes during training. If the diffusion metric collected during training is low and entropy metrics collected during training are high, then weights may be pruned in the forward passes and frozen in the backward passes during training. If the diffusion metric collected during training is low and entropy metrics collected during training are also low, this indicates that there may be redundant connections in the neural network and the number connections in the neural network can be adjusted to improve accuracy.

Figure 7:
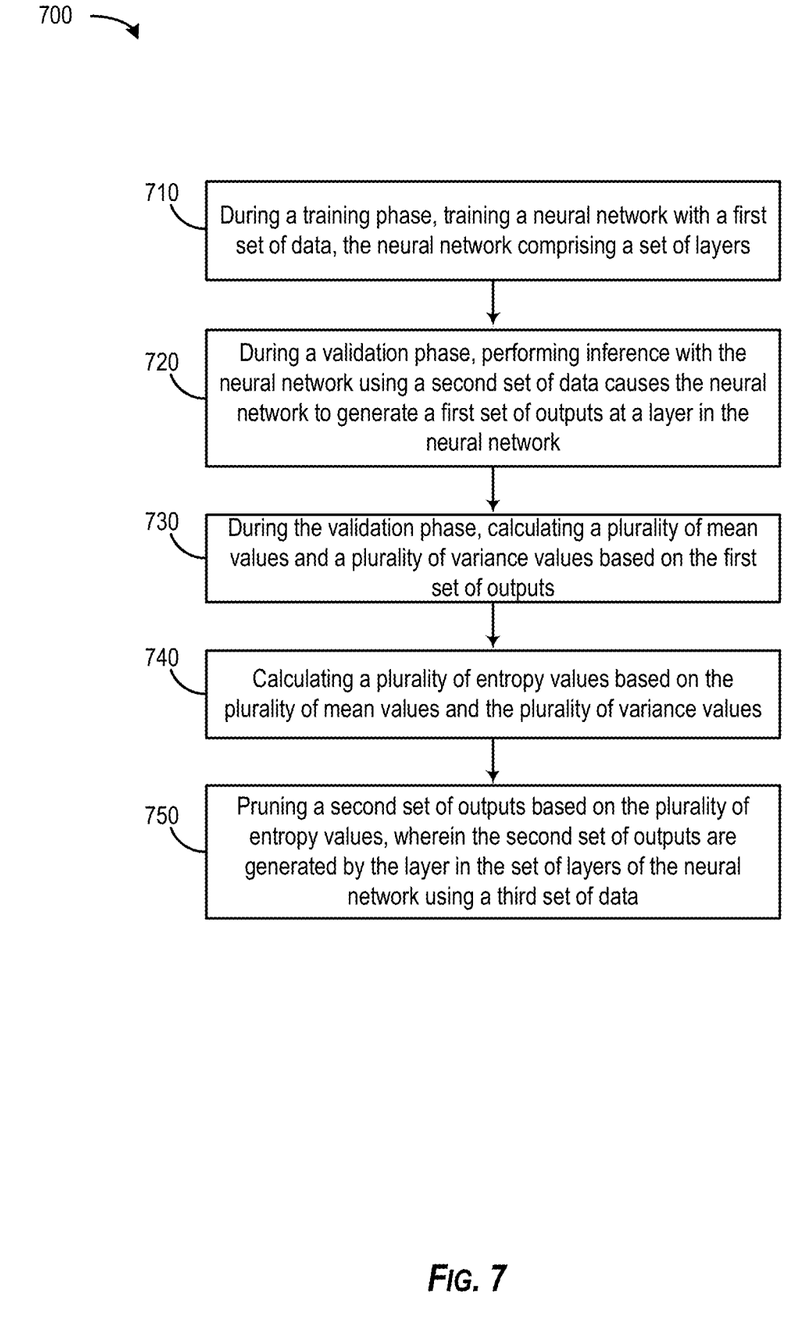
FIG. 7 illustrates a process for performing data-aware pruning according to some embodiments.

FIG. 7 illustrates a process 700 for performing data-aware pruning according to some embodiments. In some embodiments, computing system 100 performs process 700. Process 700 starts by, during a training phase, training, at 710, a neural network with a first set of data, the neural network comprising a set of layers. Referring to FIGS. 1 and 2 as an example, neural network manager 105 can train neural network 210 through multiple training iterations similar to the one described above by reference to FIG. 2. During a validation phase, process 700 performs, at 720, inference with the neural network using a second set of data causes the neural network to generate a first set of outputs at a layer in the neural network. Referring to FIGS. 1-3, neural network manager 105 performs inference with neural network 210. For example, each of the layers 215a-n can process validation data in a similar fashion as that explained above by reference to FIG. 3.

Next, during the validation phase, process 700 calculates, at 730, a plurality of mean values and a plurality of variance values based on the first set of outputs. Each mean value in the plurality of means values is calculated based on values in a same corresponding element in the first set of outputs. Each variance value in the plurality of variance values is calculated based on values in a same corresponding element in the first set of outputs. Referring to FIGS. 1-3 as an example, statistics engine 110 collects statistical data in a particular layer in neural network 210 during the validation phase.

At 740, process 700 calculates a plurality of entropy values based on the plurality of mean values and the plurality of variance values. Referring to FIG. 1 as an example, statistics engine 110 uses the equation mentioned above to calculate an entropy value for each position of the activation matrices based on the running mean and variance values calculated for that position. Finally, process 700 prunes, at 750, a second set of outputs based on the plurality of entropy values. The second set of outputs are generated by the layer in the set of layers of the neural network using a third set of data. Referring to FIGS. 1 and 6 as an example, neural network manager 105 can prune activation matrixes (e.g., activation matrix 615) generated by activation layer 315 using pruning mask 620.

Figure 8:
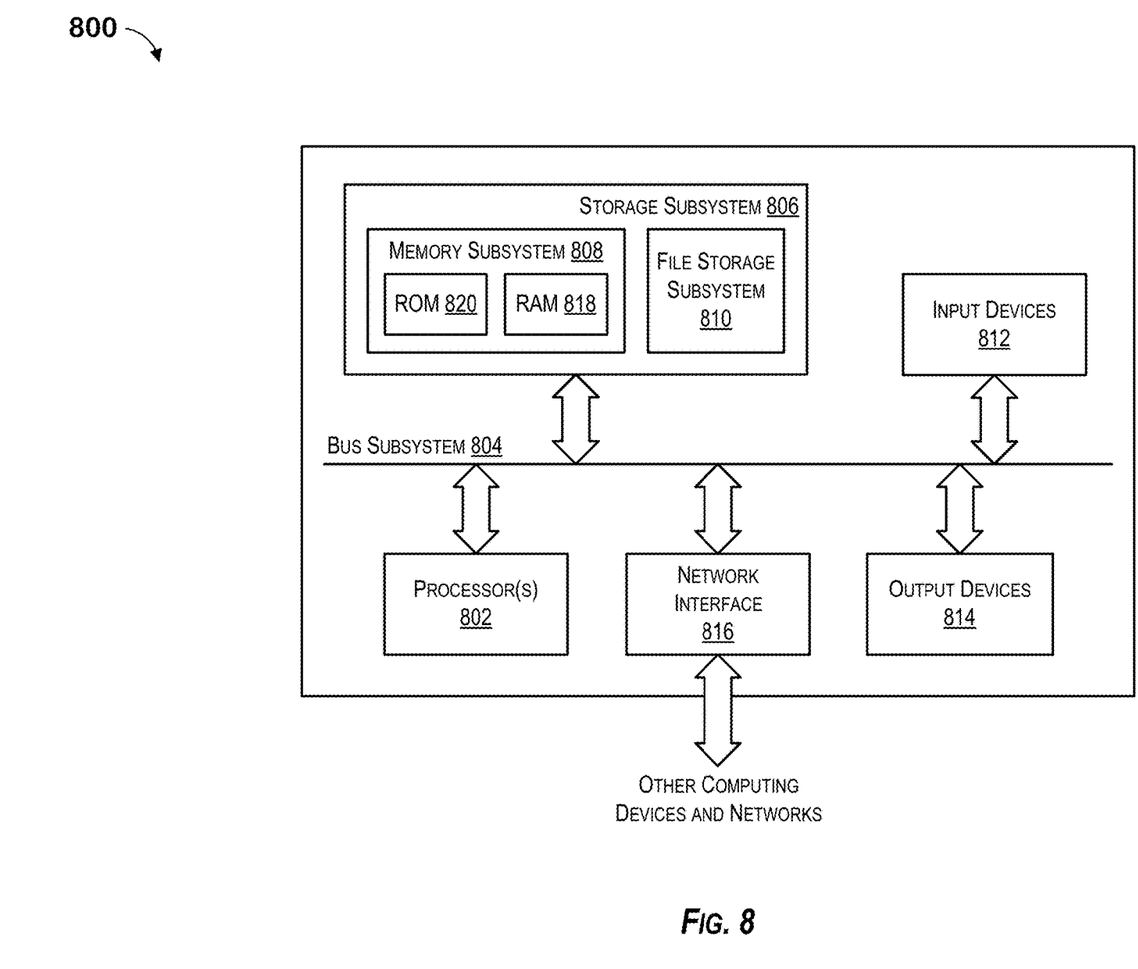
FIG. 8 depicts a simplified block diagram of an example computer system according to some embodiments.

The techniques describe above may be implemented in a wide range of computer systems configured to process neural networks. FIG. 8 depicts a simplified block diagram of an example computer system 800, which can be used to implement the techniques described in the foregoing disclosure. As shown in FIG. 8, computer system 800 includes one or more processors 802 that communicate with a number of peripheral devices via a bus subsystem 804. These peripheral devices may include a storage subsystem 806 (e.g., comprising a memory subsystem 808 and a file storage subsystem 810) and a network interface subsystem 816. Some computer systems may further include user interface input devices 812 and/or user interface output devices 814.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., Ethernet, a Wi-Fi and/or cellular adapter, a modem (telephone, satellite, cable, ISDN, etc.), digital subscriber line (DSL) units, and/or the like.

Storage subsystem 806 includes a memory subsystem 808 and a file/disk storage subsystem 810. Subsystems 808 and 810 as well as other memories described herein are examples of non-transitory computer-readable storage media that can store executable program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Figure 9:
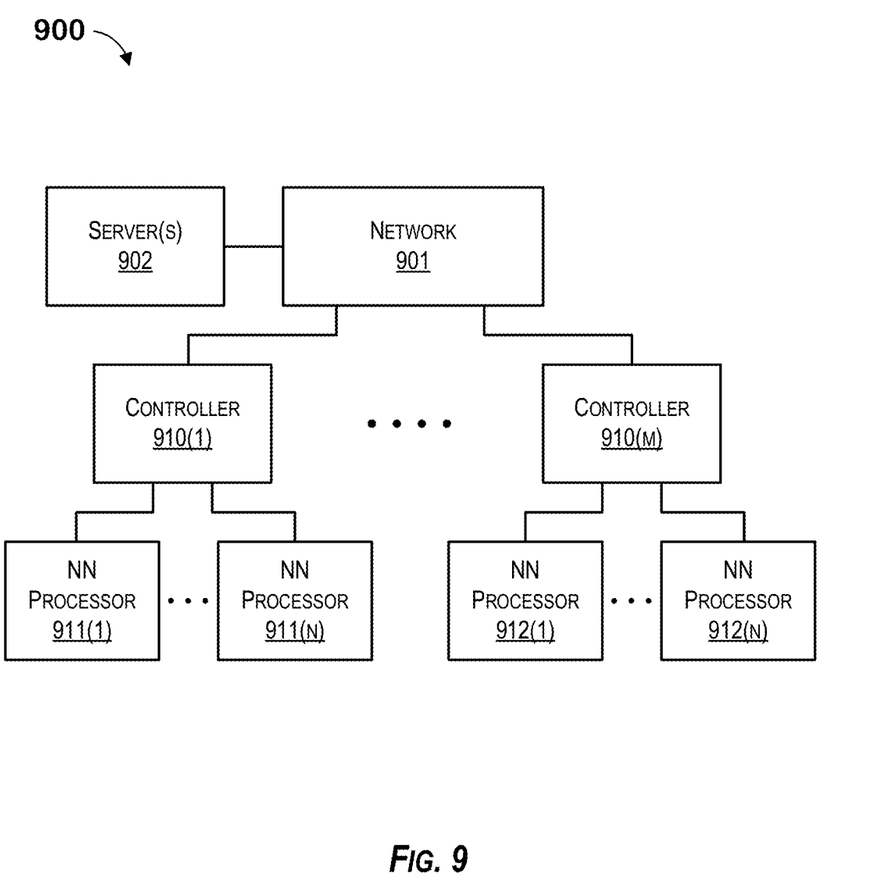
FIG. 9 illustrates a neural network processing system according to some embodiments.

FIG. 9 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 902, which may comprise architectures illustrated in FIG. 8 above, may be coupled to a plurality of controllers 910(1)-910(M) over a communication network 901 (e.g. switches, routers, etc.). Controllers 910(1)-910(M) may also comprise architectures illustrated in FIG. 8 above. Each controller 910(1)-910(M) may be coupled to one or more NN processors, such as processors 911(1)-911(N) and 912(1)-912(N), for example. NN processors 911(1)-911(N) and 912(1)-912(N) may include a variety of configurations of functional processing blocks and memory optimized for neural network processing, such as training or inference. The NN processors are optimized for neural network computations. Server 902 may configure controllers 910 with NN models as well as input data to the models, which may be loaded and executed by NN processors 911(1)-911(N) and 912(1)-912(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for performing data-aware model pruning for neural networks. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a non-transitory machine-readable medium storing a program executable by at least one processing unit of a device. The program comprising sets of instructions for, during a training phase, training a neural network with a first set of data, the neural network comprising a set of layers; during a validation phase, performing inference with the neural network using a second set of data causes the neural network to generate a first set of outputs at a layer in the neural network; during the validation phase, calculating a plurality of mean values and a plurality of variance values based on the first set of outputs, wherein each mean value in the plurality of means values is calculated based on values in a same corresponding element in the first set of outputs, wherein each variance value in the plurality of variance values is calculated based on values in a same corresponding element in the first set of outputs; calculating a plurality of entropy values based on the plurality of mean values and the plurality of variance values; and pruning a second set of outputs based on the plurality of entropy values, wherein the second set of outputs are generated by the layer in the set of layers of the neural network using a third set of data.

In one embodiment, pruning the second set of outputs comprises setting elements in each output in the second set of outputs having an associated entropy value that is less than a threshold entropy value to a defined value.

In one embodiment, the pruning the second set of outputs comprises calculating a mean value based on the plurality of entropy values; calculating a variance value based on the plurality of entropy values; determining whether the mean value is less than a first defined threshold value; determining whether the variance value is less than a second threshold value; and, upon determining that the mean value is less than the first defined threshold value and the variance value is less than the second threshold value, setting a defined proportion of elements in each output in the second set of outputs having an associated entropy value that is less than a defined third threshold value to a defined value.

In one embodiment, the present disclosure further comprises generating a pruning mask based on the plurality of entropy values. Pruning the second set of outputs comprises applying the pruning mask to each output in the second set of outputs.

In one embodiment, the pruning mask comprises a plurality of elements. Generating the pruning mask comprises determining a proportion of the plurality of entropy values having the lowest values; storing a first defined value in elements in the plurality of elements of the pruning mask corresponding the proportion of the plurality of entropy values having the lowest values; and storing a second defined value in remaining elements in the plurality of elements of the pruning mask.

In one embodiment, the pruning mask comprises a plurality of elements. Each element in the plurality of elements corresponds to a same element in each output in the first set of outputs. Generating the pruning mask comprises calculating a plurality of average entropy values, each average entropy value in the plurality of average entropy values calculated based on a set of entropy values in the plurality of entropy values; determining a defined proportion of average entropy values in the plurality of average entropy values having the lowest values; storing a first defined value in elements in the plurality of elements of the pruning mask corresponding to the set of entropy values from which each average entropy value in the proportion of the plurality of entropy values having the lowest values is calculated; and storing a second defined value in remaining elements in the plurality of elements of the pruning mask.

In one embodiment, the layer is a first layer in the neural network, the plurality of mean values is a first plurality of mean values, the plurality of variance values is a first plurality of variance values, and the plurality of entropy values is a first plurality of entropy values. Performing inference with the neural network using the second set of data further causes the neural network to generate a third set of outputs at a second layer in the neural network. The present disclosure further comprises, during the validation phase, calculating a second plurality of mean values and a second plurality of variance values based on the third set of outputs, wherein each mean value in the second plurality of means values is calculated based on values in a same corresponding element in the third set of outputs, wherein each variance value in the second plurality of variance values is calculated based on values in a same corresponding element in the third set of outputs; calculating a second plurality of entropy values based on the second plurality of mean values and the second plurality of variance values; and pruning a fourth set of outputs based on the second plurality of entropy values, wherein the fourth set of outputs are generated by the second layer in the set of layers of the neural network using a fifth set of data.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A non-transitory machine-readable medium storing a program executable by at least one processing unit of a device, the program comprising sets of instructions for:
during a training phase, training a neural network with a first set of data, the neural network comprising a set of layers;
generating a second set of outputs by a layer in the set of layers of the neural network using a third set of data;
during a validation phase, performing inference with the neural network using the second set of data causes the neural network to generate a first set of outputs at the layer in the set of layers in the neural network;
during the validation phase, calculating a plurality of running mean values and a plurality of running variance values based on the first set of outputs, wherein each mean value in the plurality of means values is calculated based on values in a same corresponding element in the first set of outputs, wherein each variance value in the plurality of variance values is calculated based on values in a same corresponding element in the first set of outputs;

calculating a plurality of entropy values based on the plurality of mean values and the plurality of variance values;

generating a pruning mask based on the plurality of entropy values; and pruning the second set of outputs by applying the pruning mask to each output in the second set of outputs.

2. The non-transitory machine-readable medium of claim 1, wherein pruning the second set of outputs comprises setting elements in each output in the second set of outputs having an associated entropy value that is less than a threshold entropy value to a defined value.

3. The non-transitory machine-readable medium of claim 1, wherein pruning the second set of outputs comprises:

calculating a mean value based on the plurality of entropy values;

calculating a variance value based on the plurality of entropy values;

determining whether the mean value is less than a first defined threshold value;

determining whether the variance value is less than a second threshold value; and upon determining that the mean value is less than the first defined threshold value and the variance value is less than the second threshold value, setting a defined proportion of elements in each output in the second set of outputs having an associated entropy value that is less than a defined third threshold value to a defined value.

4. The non-transitory machine-readable medium of claim 1, wherein the pruning mask comprises a plurality of elements, wherein generating the pruning mask comprises:

determining a proportion of the plurality of entropy values having the lowest values;

storing a first defined value in elements in the plurality of elements of the pruning mask corresponding the proportion of the plurality of entropy values having the lowest values; and storing a second defined value in remaining elements in the plurality of elements of the pruning mask.

5. The non-transitory machine-readable medium of claim 1, wherein the pruning mask comprises a plurality of elements, each element in the plurality of elements corresponding to a same element in each output in the first set of outputs, wherein generating the pruning mask comprises:

calculating a plurality of average entropy values, each average entropy value in the plurality of average entropy values calculated based on a set of entropy values in the plurality of entropy values;

determining a defined proportion of average entropy values in the plurality of average entropy values having the lowest values;

storing a first defined value in elements in the plurality of elements of the pruning mask corresponding to the set of entropy values from which each average entropy value in the proportion of the plurality of entropy values having the lowest values is calculated; and storing a second defined value in remaining elements in the plurality of elements of the pruning mask.

6. The non-transitory machine-readable medium of claim 1, wherein the layer is a first layer in the neural network, wherein the plurality of mean values is a first plurality of mean values, wherein the plurality of variance values is a first plurality of variance values, wherein the plurality of entropy values is a first plurality of entropy values, wherein performing inference with the neural network using the second set of data further causes the neural network to generate a third set of outputs at a second layer in the neural network, wherein the program further comprises a set of instructions for:

during the validation phase, calculating a second plurality of mean values and a second plurality of variance values based on the third set of outputs, wherein each mean value in the second plurality of means values is calculated based on values in a same corresponding element in the third set of outputs, wherein each variance value in the second plurality of variance values is calculated based on values in a same corresponding element in the third set of outputs;

calculating a second plurality of entropy values based on the second plurality of mean values and the second plurality of variance values; and pruning a fourth set of outputs based on the second plurality of entropy values, wherein the fourth set of outputs are generated by the second layer in the set of layers of the neural network using a fifth set of data.

7. A method comprising:

during a training phase, training a neural network with a first set of data, the neural network comprising a set of layers;

generating a second set of outputs by a layer in the set of layers of the neural network using a third set of data;

during a validation phase, performing inference with the neural network using the second set of data causes the neural network to generate a first set of outputs at the layer in the set of layers in the neural network;

during the validation phase, calculating a plurality of running mean values and a plurality of running variance values based on the first set of outputs, wherein each mean value in the plurality of means values is calculated based on values in a same corresponding element in the first set of outputs, wherein each variance value in the plurality of variance values is calculated based on values in a same corresponding element in the first set of outputs;

calculating a plurality of entropy values based on the plurality of mean values and the plurality of variance values;

generating a pruning mask based on the plurality of entropy values; and pruning the second set of outputs by applying the pruning mask to each output in the second set of outputs.

8. The method of claim 7, wherein pruning the second set of outputs comprises setting elements in each output in the second set of outputs having an associated entropy value that is less than a threshold entropy value to a defined value.

9. The method of claim 7, wherein pruning the second set of outputs comprises:

calculating a mean value based on the plurality of entropy values;

calculating a variance value based on the plurality of entropy values;

determining whether the mean value is less than a first defined threshold value;

determining whether the variance value is less than a second threshold value; and upon determining that the mean value is less than the first defined threshold value and the variance value is less than the second threshold value, setting a defined proportion of elements in each output in the second set of outputs having an associated entropy value that is less than a defined third threshold value to a defined value.

10. The method of claim 7, wherein the pruning mask comprises a plurality of elements, wherein generating the pruning mask comprises:
   determining a proportion of the plurality of entropy values having the lowest values;
   storing a first defined value in elements in the plurality of elements of the pruning mask corresponding the proportion of the plurality of entropy values having the lowest values; and
   storing a second defined value in remaining elements in the plurality of elements of the pruning mask.

11. The method of claim 7, wherein the pruning mask comprises a plurality of elements, each element in the plurality of elements corresponding to a same element in each output in the first set of outputs, wherein generating the pruning mask comprises:
   calculating a plurality of average entropy values, each average entropy value in the plurality of average entropy values calculated based on a set of entropy values in the plurality of entropy values;
   determining a defined proportion of average entropy values in the plurality of average entropy values having the lowest values;
   storing a first defined value in elements in the plurality of elements of the pruning mask corresponding to the set of entropy values from which each average entropy value in the proportion of the plurality of entropy values having the lowest values is calculated; and
   storing a second defined value in remaining elements in the plurality of elements of the pruning mask.

12. The method of claim 7, wherein the layer is a first layer in the neural network, wherein the plurality of mean values is a first plurality of mean values, wherein the plurality of variance values is a first plurality of variance values, wherein the plurality of entropy values is a first plurality of entropy values, wherein performing inference with the neural network using the second set of data further causes the neural network to generate a third set of outputs at a second layer in the neural network, the method further comprising:
   during the validation phase, calculating a second plurality of mean values and a second plurality of variance values based on the third set of outputs, wherein each mean value in the second plurality of means values is calculated based on values in a same corresponding element in the third set of outputs, wherein each variance value in the second plurality of variance values is calculated based on values in a same corresponding element in the third set of outputs;
   calculating a second plurality of entropy values based on the second plurality of mean values and the second plurality of variance values; and
   pruning a fourth set of outputs based on the second plurality of entropy values, wherein the fourth set of outputs are generated by the second layer in the set of layers of the neural network using a fifth set of data.

13. A system comprising:
   a set of processing units; and
   a non-transitory machine-readable medium storing instructions that when executed by at least one processing unit in the set of processing units cause the at least one processing unit to:
      during a training phase, training a neural network with a first set of data, the neural network comprising a set of layers;
      generating a second set of outputs by a layer in the set of layers of the neural network using a third set of data;
      during a validation phase, performing inference with the neural network using the second set of data causes the neural network to generate a first set of outputs at the layer in the set of layers in the neural network;
      during the validation phase, calculating a plurality of running mean values and a plurality of running variance values based on the first set of outputs, wherein each mean value in the plurality of means values is calculated based on values in a same corresponding element in the first set of outputs, wherein each variance value in the plurality of variance values is calculated based on values in a same corresponding element in the first set of outputs;
      calculating a plurality of entropy values based on the plurality of mean values and the plurality of variance values;
      generating a pruning mask based on the plurality of entropy values; and
      pruning the second set of outputs by applying the pruning mask to each output in the second set of outputs.

14. The system of claim 13, wherein pruning the second set of outputs comprises setting elements in each output in the second set of outputs having an associated entropy value that is less than a threshold entropy value to a defined value.

15. The system of claim 13, wherein pruning the second set of outputs comprises:
   calculating a mean value based on the plurality of entropy values;
   calculating a variance value based on the plurality of entropy values;
   determining whether the mean value is less than a first defined threshold value;
   determining whether the variance value is less than a second threshold value; and
   upon determining that the mean value is less than the first defined threshold value and the variance value is less than the second threshold value, setting a defined proportion of elements in each output in the second set of outputs having an associated entropy value that is less than a defined third threshold value to a defined value.

16. The system of claim 13, wherein the pruning mask comprises a plurality of elements, wherein generating the pruning mask comprises:
   determining a proportion of the plurality of entropy values having the lowest values;
   storing a first defined value in elements in the plurality of elements of the pruning mask corresponding the proportion of the plurality of entropy values having the lowest values; and
   storing a second defined value in remaining elements in the plurality of elements of the pruning mask.

17. The system of claim 13, wherein the pruning mask comprises a plurality of elements, each element in the plurality of elements corresponding to a same element in each output in the first set of outputs, wherein generating the pruning mask comprises:
   calculating a plurality of average entropy values, each average entropy value in the plurality of average entropy values calculated based on a set of entropy values in the plurality of entropy values;

determining a defined proportion of average entropy values in the plurality of average entropy values having the lowest values;

storing a first defined value in elements in the plurality of elements of the pruning mask corresponding to the set of entropy values from which each average entropy value in the proportion of the plurality of entropy values having the lowest values is calculated; and storing a second defined value in remaining elements in the plurality of elements of the pruning mask.

* * * * *